March 23, 1926.
G. W. GOULD ET AL
AUTOMATIC MACHINE FOR CUTTING DOOR STILES
Filed Dec. 7, 1923 14 Sheets-Sheet 1
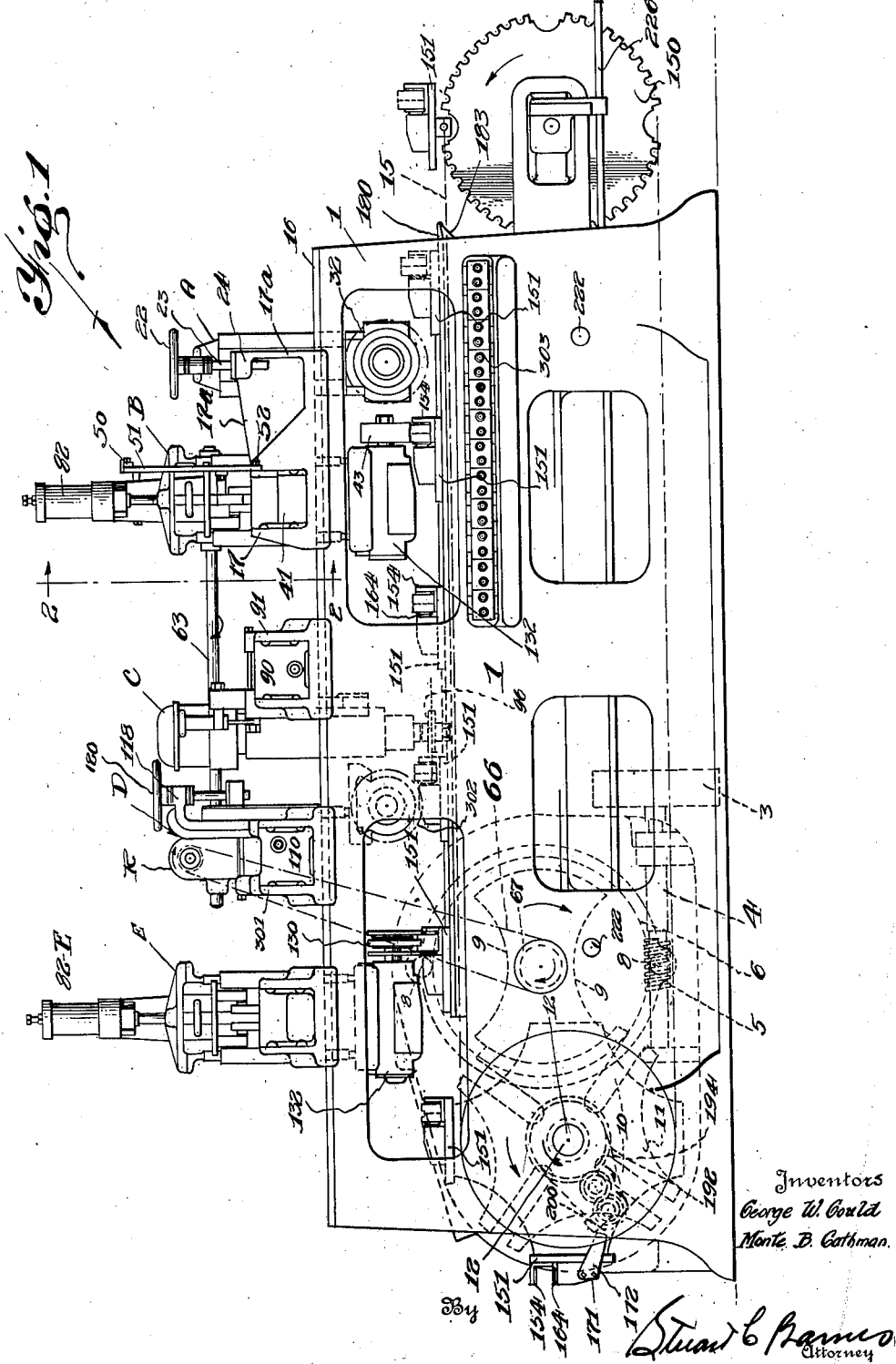
Inventors
George W. Gould
Monte B. Cathman

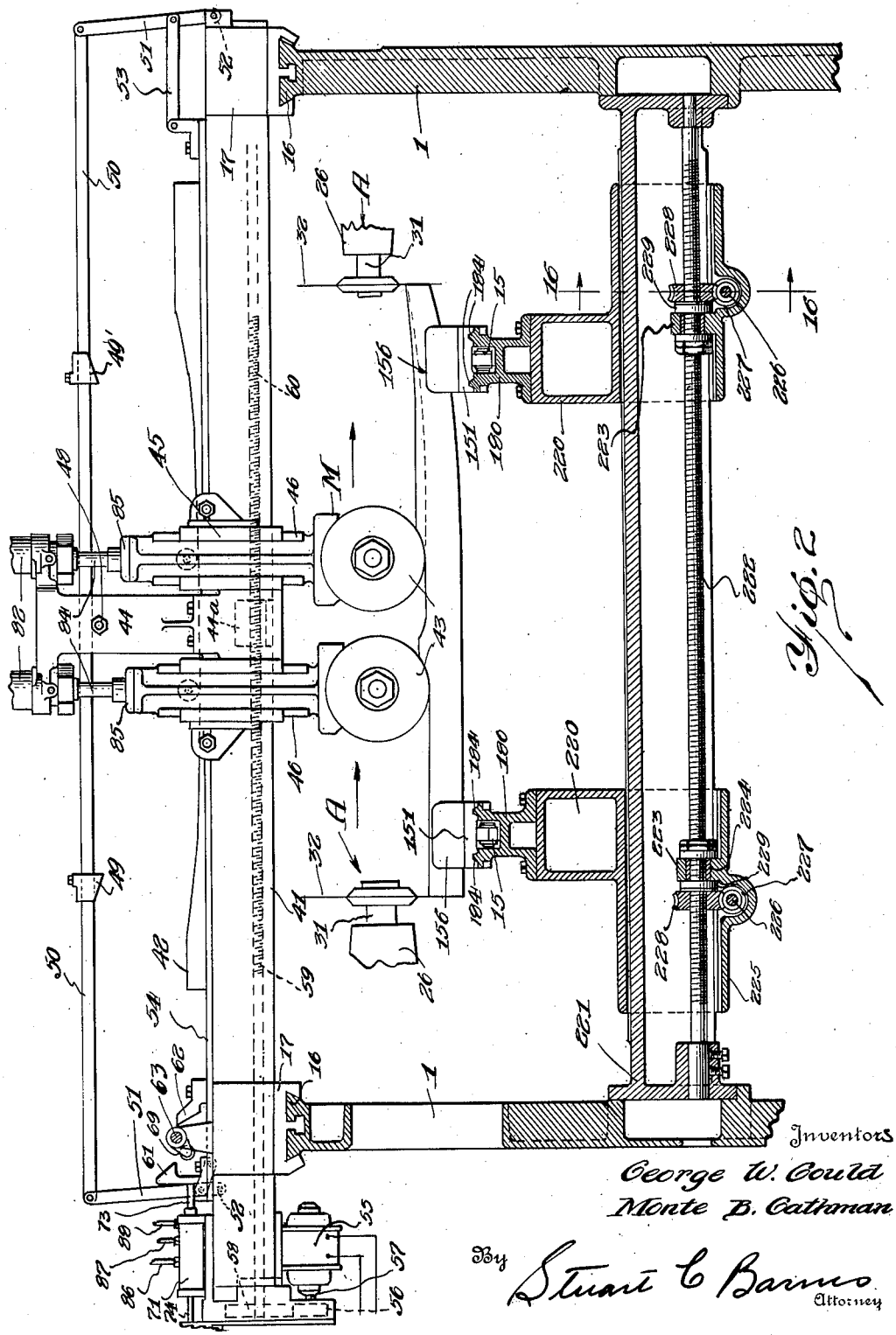

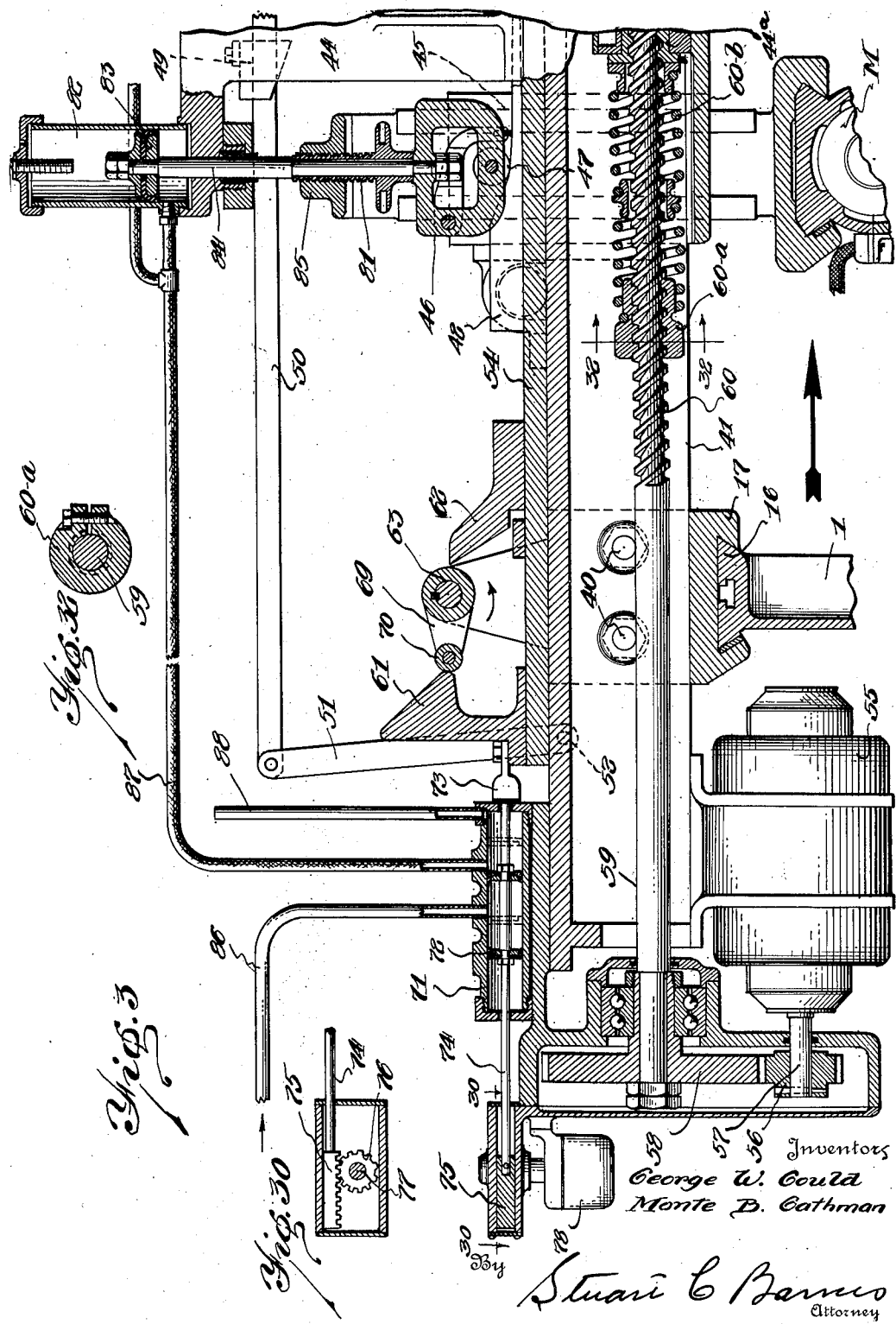

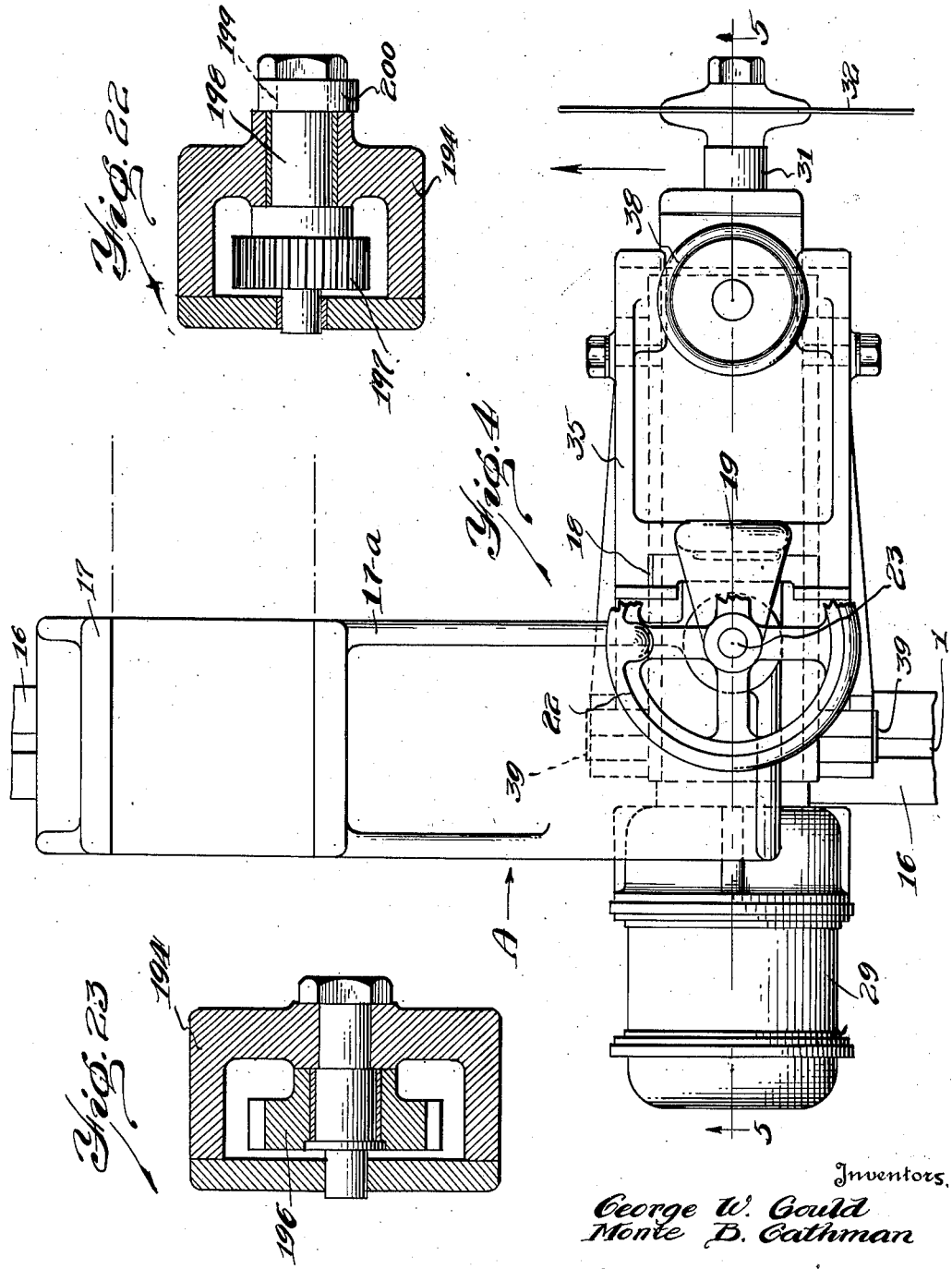

March 23, 1926.
G. W. GOULD ET AL
1,577,744
AUTOMATIC MACHINE FOR CUTTING DOOR STILES
Filed Dec. 7, 1923
14 Sheets-Sheet 5
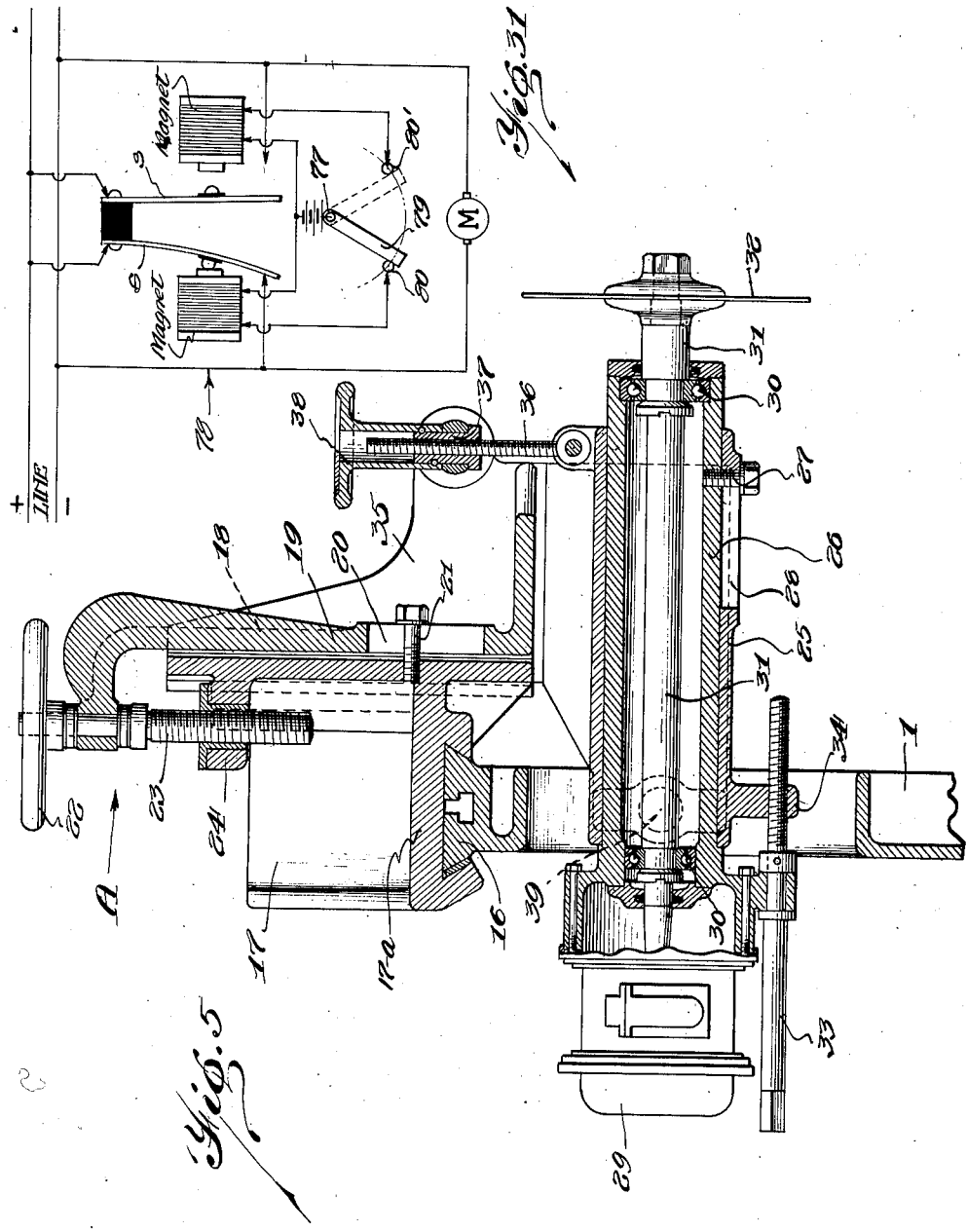
Inventors
George W. Gould
Monte B. Gathman
By Stuart C. Barnes
Attorney

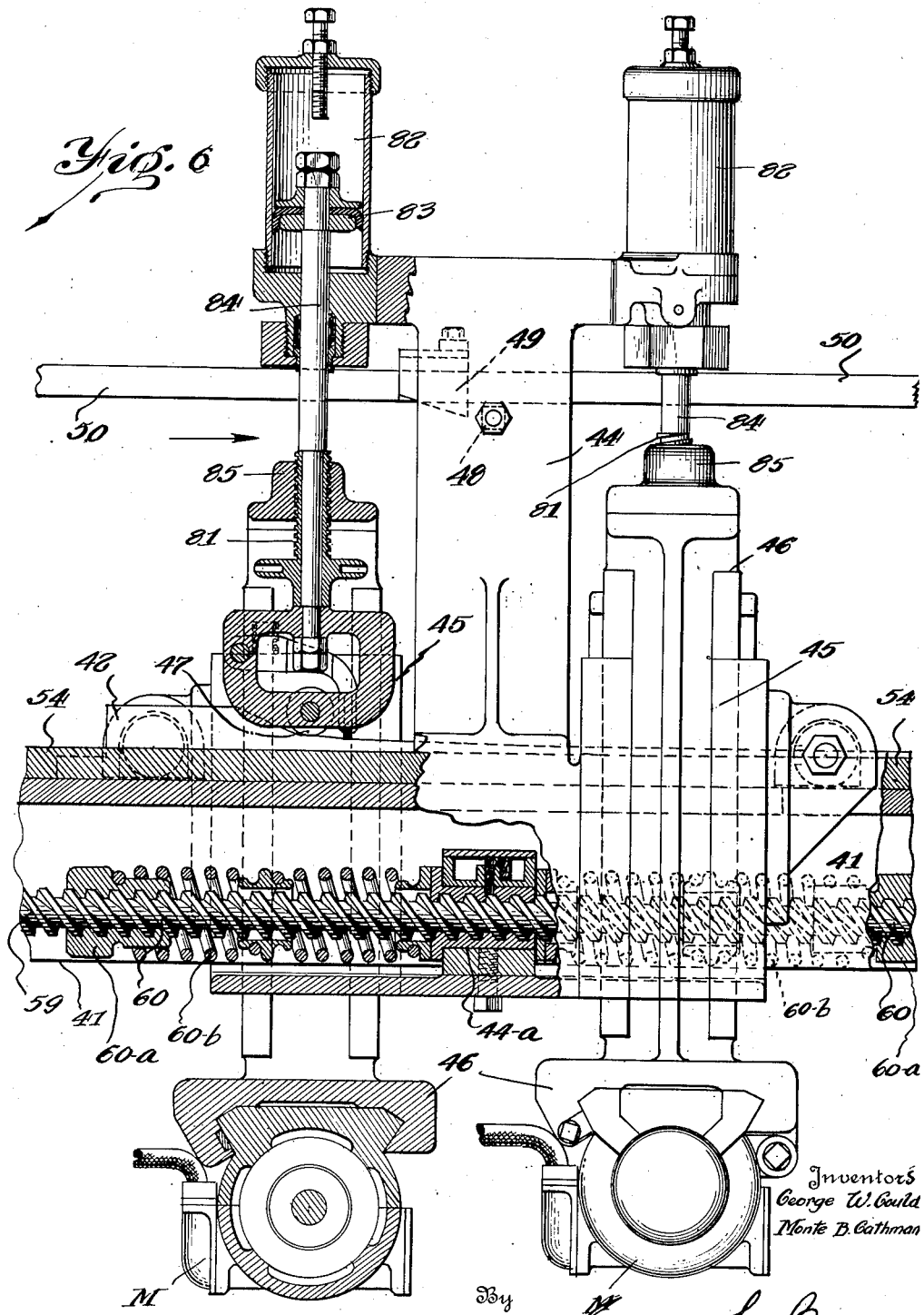

March 23, 1926. 1,577,744
G. W. GOULD ET AL
AUTOMATIC MACHINE FOR CUTTING DOOR STILES
Filed Dec. 7, 1923 14 Sheets-Sheet 7
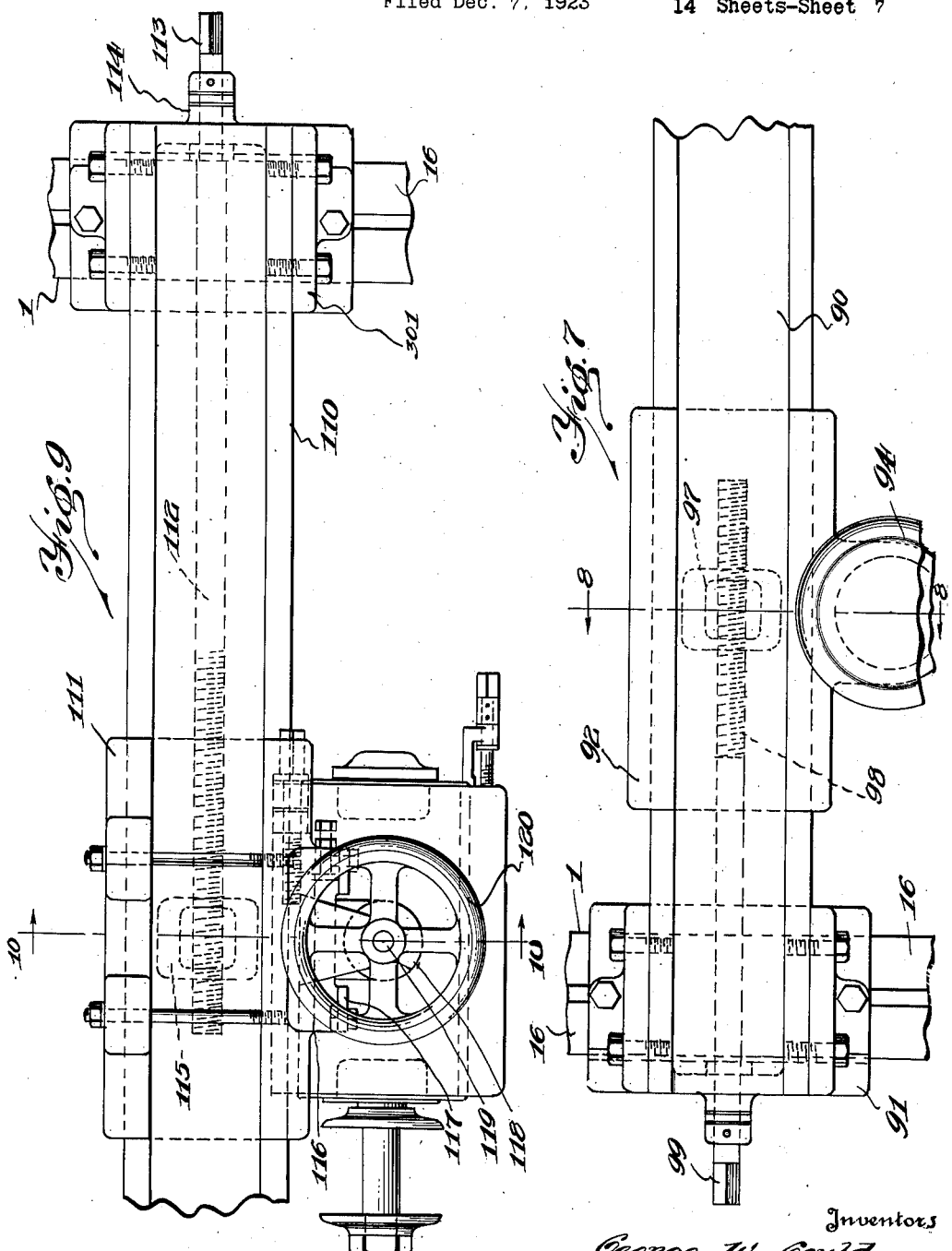
Inventors
George W. Gould
Monte B. Cathman
By Stuart C. Barnes
Attorney

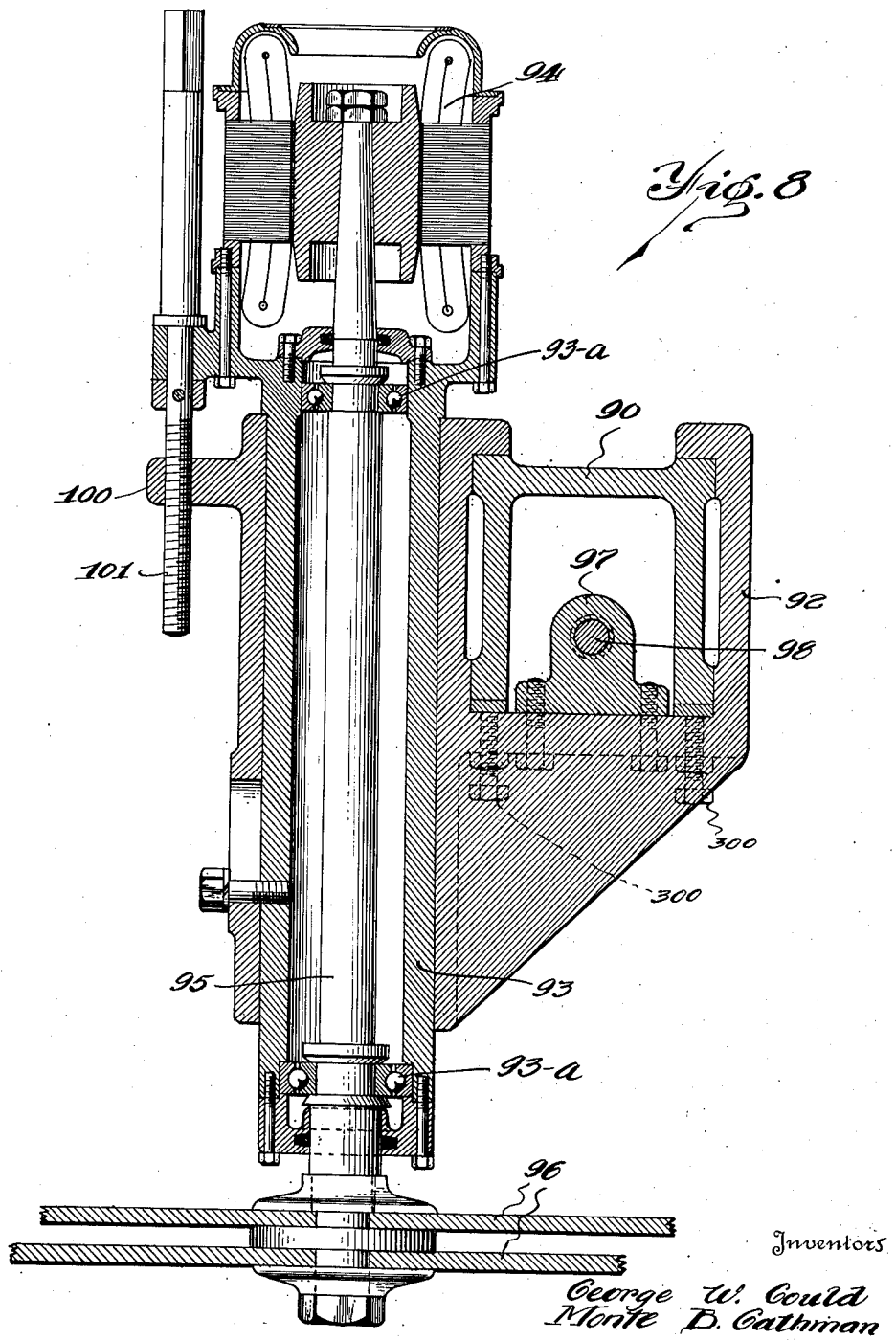

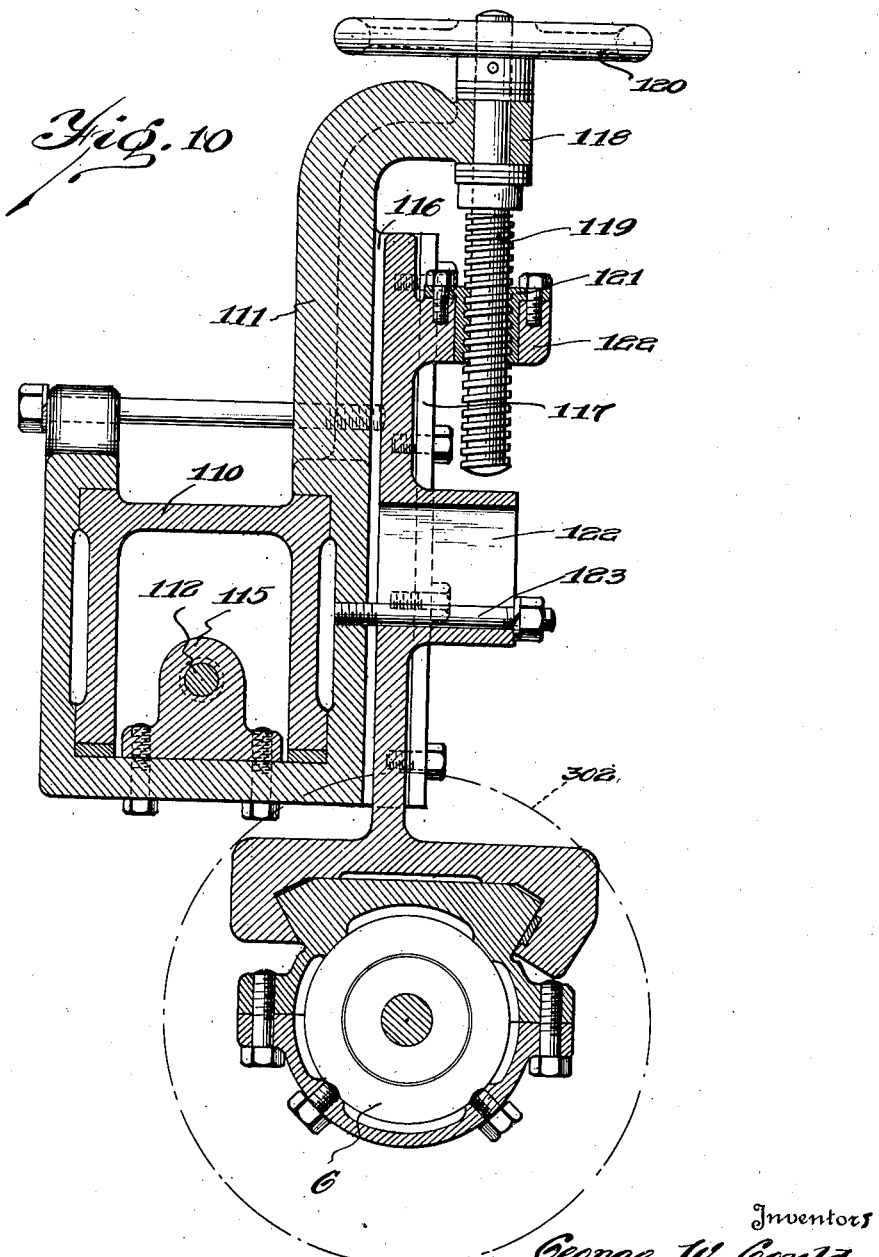

March 23, 1926.  
G. W. GOULD ET AL  
1,577,744  
AUTOMATIC MACHINE FOR CUTTING DOOR STILES  
Filed Dec. 7, 1923 14 Sheets-Sheet 10

Inventors  
George W. Gould  
Monte B. Gathman  
By Stuart C. Barnes  
Attorney

March 23, 1926. 1,577,744
G. W. GOULD ET AL
AUTOMATIC MACHINE FOR CUTTING DOOR STILES
Filed Dec. 7, 1923   14 Sheets-Sheet 11
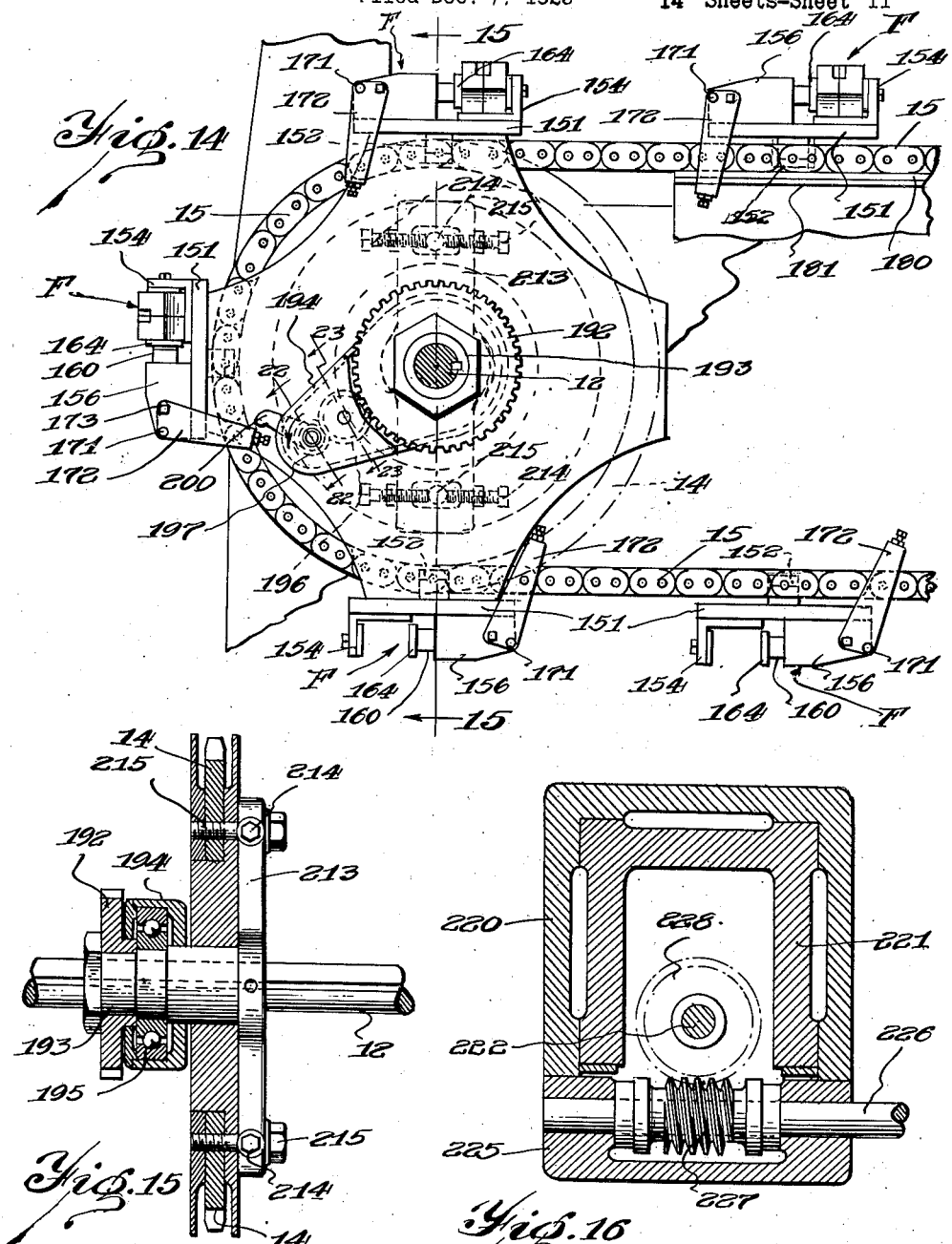
Inventors
George W. Gould
Monte B. Gathman
By Stuart C. Barnes
Attorney

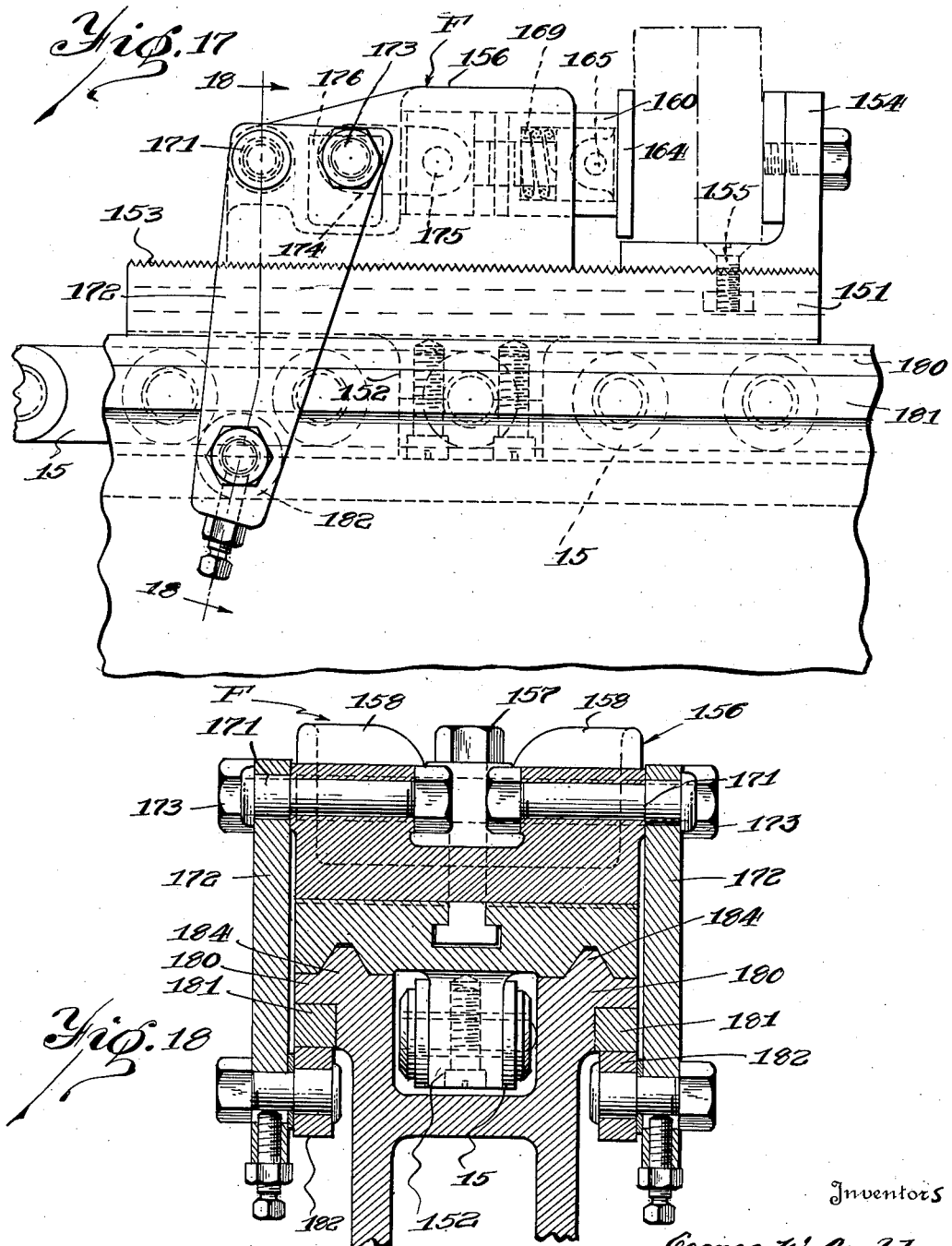

March 23, 1926.
G. W. GOULD ET AL
1,577,744
AUTOMATIC MACHINE FOR CUTTING DOOR STILES
Filed Dec. 7, 1923   14 Sheets-Sheet 13
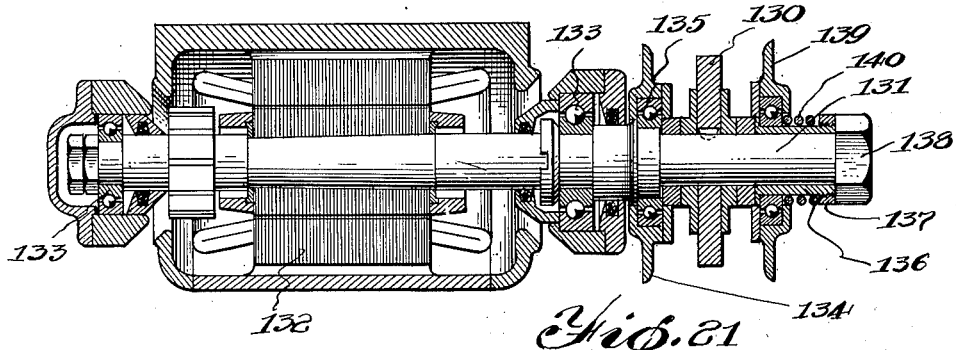
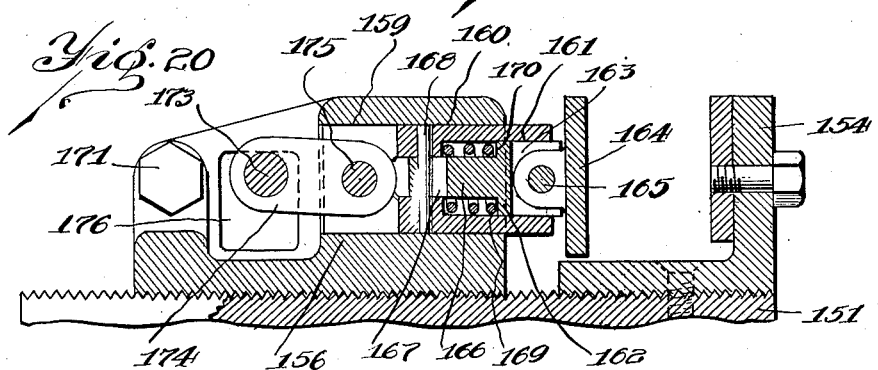
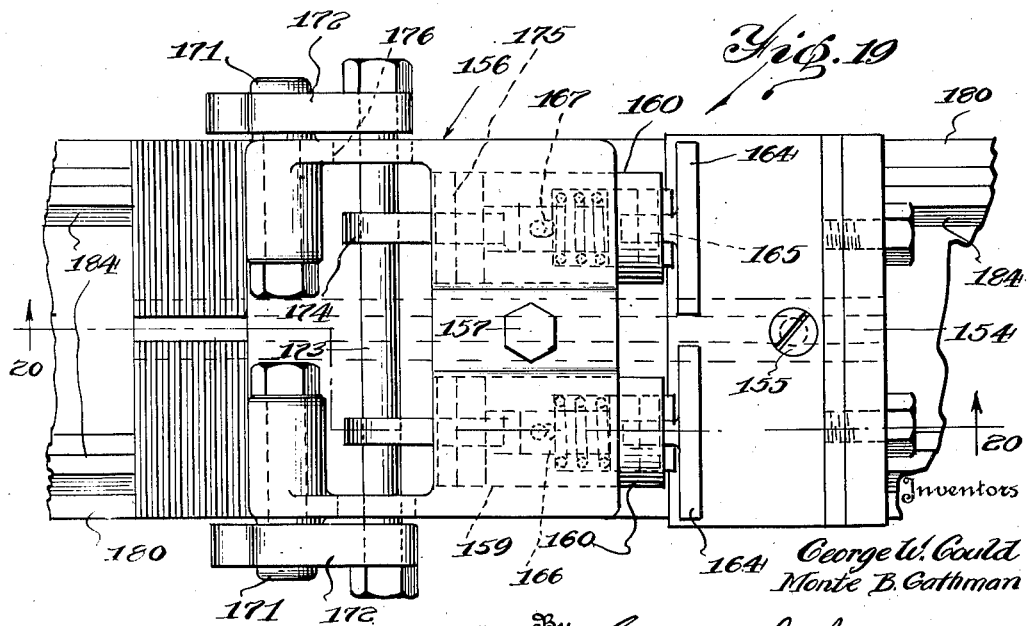

March 23, 1926. 1,577,744
G. W. GOULD ET AL
AUTOMATIC MACHINE FOR CUTTING DOOR STILES
Filed Dec. 7, 1923 14 Sheets-Sheet 14
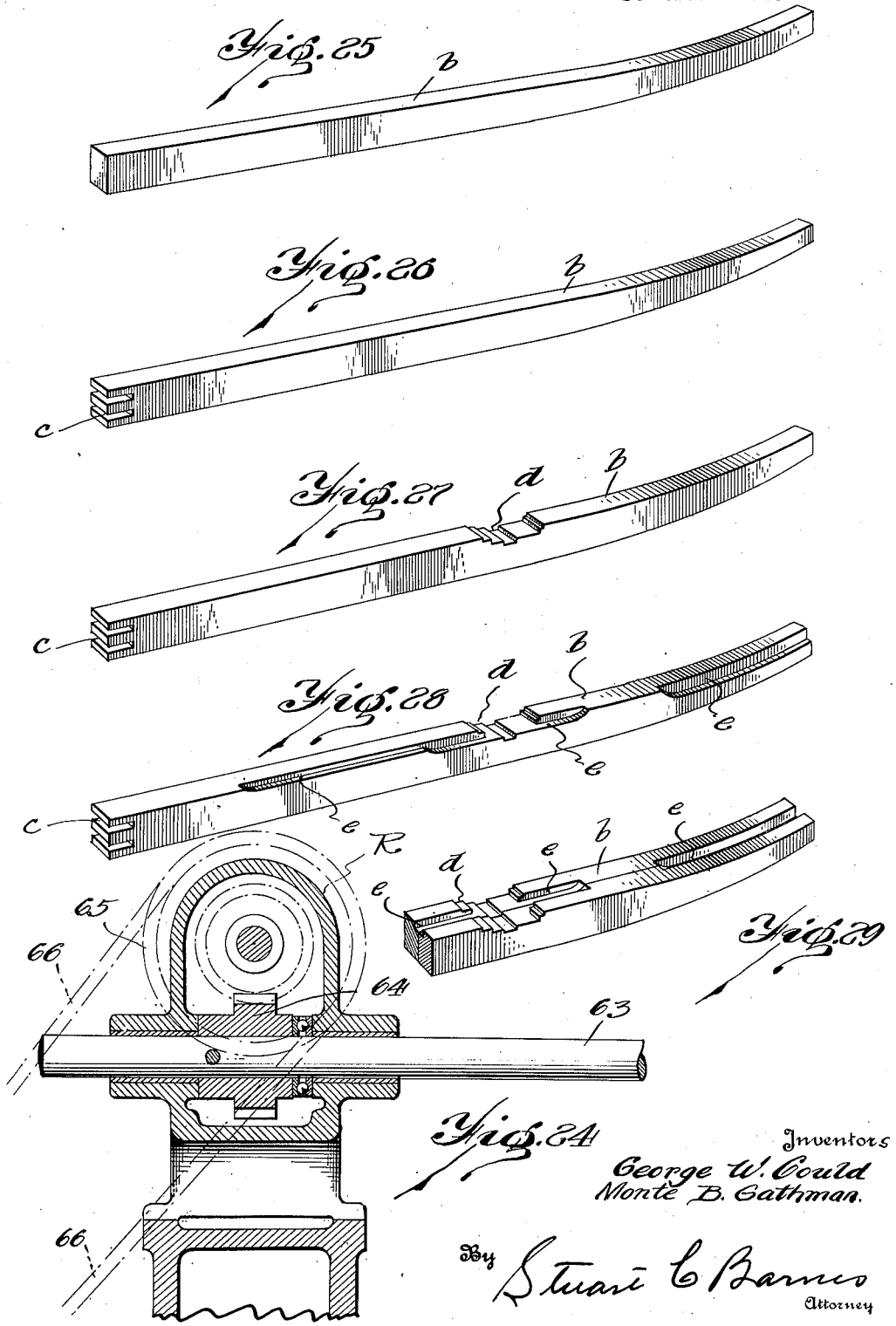
Inventors
George W. Gould
Monte B. Gathman.
By Stuart C. Barnes
Attorney Patented Mar. 23, 1926.

1,577,744

UNITED STATES PATENT OFFICE.

GEORGE W. GOULD AND MONTE B. GATHMAN, OF DETROIT, MICHIGAN, ASSIGNORS TO FISHER BODY CORPORATION, OF DETROIT, MICHIGAN, A CORPORATION OF NEW YORK.

AUTOMATIC MACHINE FOR CUTTING DOOR STILES.

Application filed December 7, 1923. Serial No. 679,184.

*To all whom it may concern:*

Be it known that GEORGE W. GOULD and MONTE B. GATHMAN, citizens of the United States, residing at Detroit, in the county of Wayne and State of Michigan, have invented certain new and useful Improvements in Automatic Machines for Cutting Door Stiles, of which the following is a specification.

This invention relates to a machine for cutting door pillars and is more particularly used in shaping and cutting pillars used for closed automobile bodies. However, the machine has a broad applicability for performing automatically several shaping and cutting operations on any piece of work of a somewhat similar nature.

Up to the present time, door pillars or stiles have been made on machines which separately shaped the pillar and cut the several grooves in the pillar, a different machine being utilized for each cutting operation. It is necessary with the old method to properly locate the pillar or stile when it is undergoing the several cutting operations in each machine by means of a jig or other device. Obviously, much valuable time is lost in the re-positioning of the pillar in the separate machines as the different cutting operations are performed. In addition there is more chance of error in the old method of cutting these door pillars because of the many handlings, and consequent increase in the chances for human error.

The object of the present machine is to progressively perform these cutting operations by an automatic machine. Referring to the drawings, it will be seen that the grooves and channels are cut into the door pillar in different planes and in different directions, some running transversely of the door pillar and some running longitudinally of the door pillar. It is evident from this that an automatic machine for performing these operations must necessarily provide means for performing some of the cuts while the work is traveling and to perform the others while the work is at rest. This necessitates an intermittent movement of the work carriages, and a co-ordination of the cutting units whereby the work may be passed under some of the cutting units to cut the transverse grooves in the pillar and be stopped and held stationary for a certain period of time while other cutting units may travel longitudinally of the work for cutting longitudinal grooves in the pillar. Since there are several operations of both classes it is necessary to so stop the work carriages that the work will be positioned under a cutting unit for performing one longitudinal cutting operation, while another piece of work is simultaneously stopped under another cutting unit for performing a different longitudinal cutting operation. Obviously, the cutting units must be so positioned and so co-ordinated in the automatic machine that these several longitudinal cutting operations may be performed simultaneously. That is, one operation is performed on one piece of work while the second cutting operation will be performed on another piece of work, and the carriage will then move forward so as to bring the work which had the primary cutting operation performed thereon under the second mentioned cutting unit, and bring a new piece of work under the first mentioned cutting unit. The cutting operations which cut the transverse grooves in the pillar are performed while the work is traveling and for convenience, these operations are performed while the work is traveling from one longitudinal cutting operation to the other.

Different kinds of longitudinal cuts are to be taken in the pillar, some of which necessitate the stopping of work at an exact point. Due to the fact that it is impossible to so construct a chain conveyor that will stop at an exact point with only a few thousandths of an inch allowance, it is necessary to provide some additional means whereby the cutter may be exactly located above the work. Experience has shown that a chain conveyor may be stopped only within a space of about 1/16 of an inch. This is too great an error and we have provided means whereby the cutter may be automatically positioned so as to cut the longitudinal groove in the pillar with an allowance of a few thousandths of an inch error.

A further object is to provide means for feeding the cutters which do the longitudinal cutting of the pillar. A still further object is to provide means for automatically performing this feeding operation so as to feed the cutters across the work and to automatically return the same to their initial position.

Another object is to provide a knock-out whereby the work may be knocked out of the work carriage, the carriage then returning to the front of the machine where a new piece of work may be clamped therein. Means are also provided for automatically releasing the same as the same is knocked out.

We have further provided an adjustment in the driving mechanism whereby the work carriage may be correctly positioned with respect to the cutting units. In assembling the machine, a rough adjustment is made of the working parts and a fine adjustment is made afterwards in the driving parts, to either advance or retard the same for the purpose of obtaining an exact adjustment.

A still further object is to construct a machine that will simultaneously cut a right hand and left hand door pillar.

In the drawings:

Fig. 1 is a side elevation of the machine.

Fig. 2 is a transverse section taken on the line 2—2 of Fig. 1, showing the shaping unit, and means for adjusting the position of the conveyor and work carriage.

Fig. 3 is an enlarged transverse section showing the means for feeding either the shaping unit or rabbeting unit.

Fig. 4 is a plan view of one of the cut-off units.

Fig. 5 is a vertical section taken on the line 5—5 of Fig. 4.

Fig. 6 is an enlarged vertical section of either the rabbeting or shaping unit.

Fig. 7 is a plan view of the grooving unit.

Fig. 8 is a vertical section on the line 8—8 of Fig. 7.

Fig. 9 is a plan view of the gaining unit.

Fig. 10 is a vertical section taken on the line 10—10 of Fig. 9.

Fig. 14 is a detail in elevation of the rear end of the conveyor showing the knockout.

Fig. 15 is a section taken on the line 15—15 of Fig. 14.

Fig. 16 is a section taken on the line 16—16 of Fig. 2.

Fig. 17 is an elevational detail of the work carriage or vise.

Fig. 18 is a transverse section of the same taken on the line 18—18 of Fig. 17.

Fig. 19 is a plan view of the work carriage.

Fig. 20 is a vertical longitudinal section of the same taken on the line 20—20 of Fig. 19.

Fig. 21 is a sectional detail showing the rabbeting cutter and the means for correctly positioning the same with respect to the work.

Figs. 22 and 23 are sections taken on the lines 22—22 and 23—23 of Fig. 14, respectively.

Fig. 24 is a sectional detail of the casing R (Fig. 1) showing the driving means for actuating the cam shaft for automatically reversing the feed of the longitudinally traveling cutting units.

Figs. 25 to 28 inclusive, are details in perspective of the door pillars or stiles progressively showing the separate cutting operations performed thereon.

Fig. 29 is a detail in perspective showing how the right and left hand door pillars may be simultaneously formed.

Fig. 30 is a horizontal section taken on the line 30—30 of Fig. 3.

Fig. 31 is a diagrammatic view of the switch connections.

Fig. 32 is a detail section taken on the line 32—32 of Fig. 3.

The machine frame 1 is adapted to adjustably support a plurality of cutting units. The manner in which the adjustment of these cutting units may be made with respect to the support will be described in detail as the separate cutting units are described. In this machine, the door pillar has five cutting operations performed thereon, and we will designate these cutting units as a whole, such as the cut-off A, the shaping unit B, the grooving unit C, the gaining unit D, and the rabbeting unit E.

Referring to Figs. 25 to 28, we will explain the different cutting operations. Refer to Fig. 1 to see the position of the various units. First the ends of the pillar are cut off by the two cut-off units A, (see Fig. 2) to the correct length; then the shaping unit B will shape and finish the surface $b$ (Fig. 25). The groover unit C, will next cut the grooves $c$ in the end of the door pillar (Fig. 26). The next step in the forming of the door pillar is performed by the gaining unit D, which gains the pillar as at $d$ (Fig. 27). The next step is the rabbeting or longitudinal grooving of the door pillar as at $e$ (Fig. 28) by the rabbeting unit E. In Fig. 29 we show how two pieces of work are laid side by side and the cutting operations performed by cutting units A, B, C, and D are performed on both pillars. The rabbeting unit E, however, is adjusted to cut a longitudinal groove in the pillar, the cutter arranged to be centrally located with respect to the two pillars and will cut the groove $e$ in both pillars as shown in Fig. 29, thereby making a right and left hand door pillar.

Figure 11:
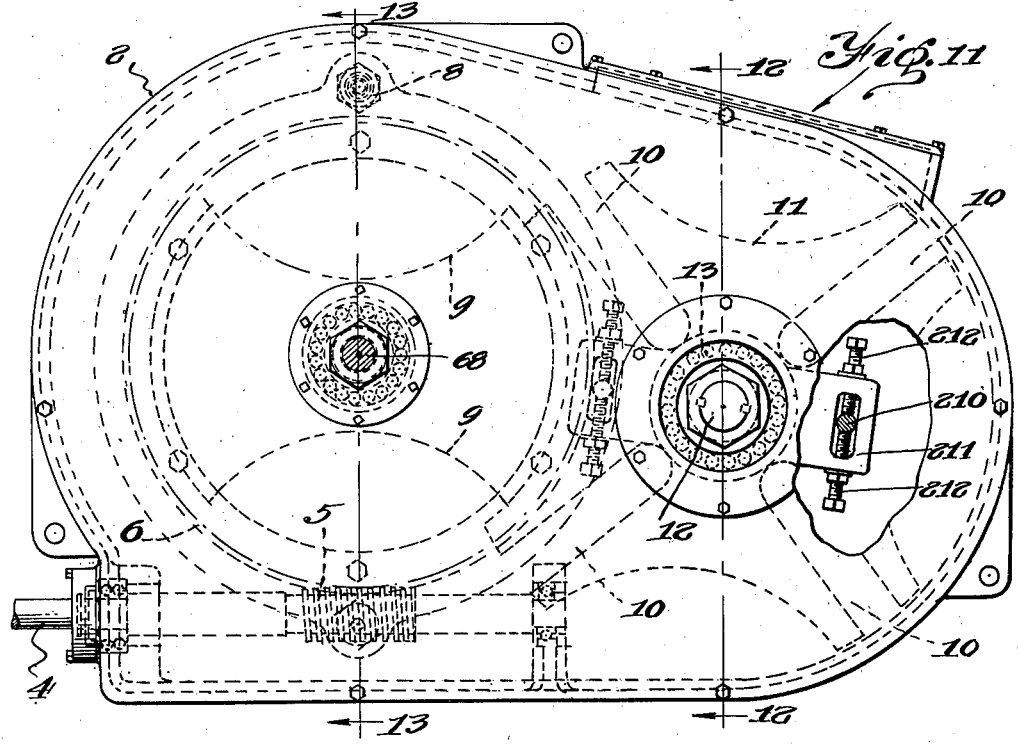
Fig. 11 is a detail in elevation of the driving unit.
Figures 12, 13:
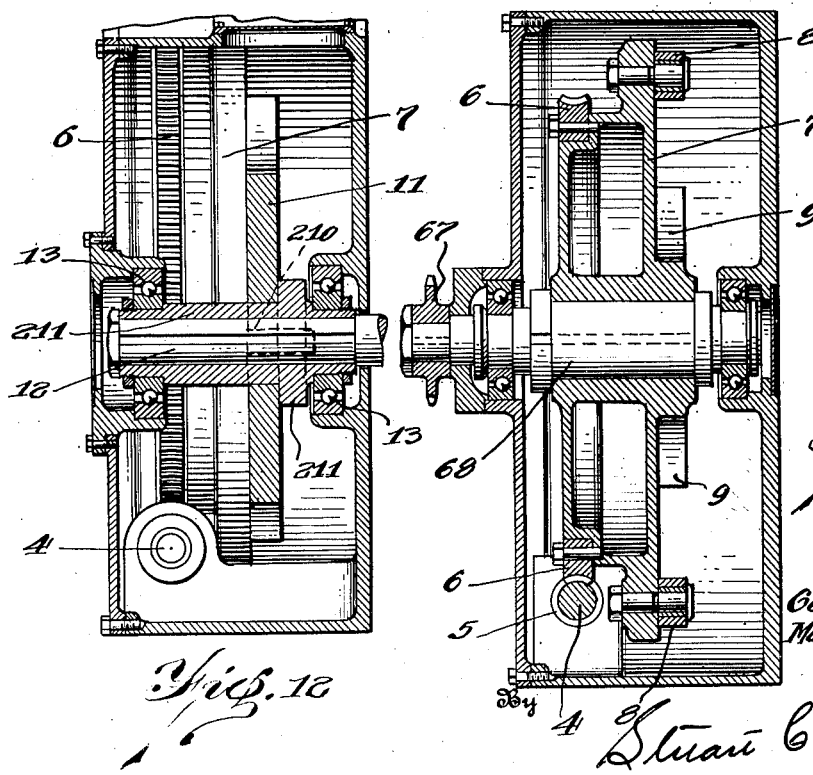
Fig. 12 is a section taken on the line 12—12 of Fig. 11.
Fig. 13 is a section taken on the line 13—13 of Fig. 11.

To thoroughly understand the performance of the machine, it will be necessary first to describe the driving mechanism and the work carriage (Figs. 11-13). Supported by the frame of the machine is a transmission casing 2, which encloses a "Geneva" movement for the purpose of obtaining an intermittent movement of the work carriage. A pulley 3, (Fig. 1) is adapted to be driven continuously from any source of power. Secured to this pulley is a shaft 4, on which is secured the worm 5, which drives the worm gear 6, rotatably supported within the casing. Secured to this worm gear is a wheel 7, provided with the rollers 8 and segmental guide surfaces 9 of the "Geneva" mechanism. The rollers engage in the slots 10 to intermittently drive the "Geneva" wheel 11 in a familiar way. This wheel 11 is secured by pin 210 (Fig. 12) to the collar 211 which is in turn keyed to the shaft 12, said shaft being supported in ball bearing sets 13 carried by the gear casing. The shaft 12, extends transversely of the machine frame and is rotatably supported thereby (Fig. 1). Secured to the shaft 12 are a pair of driving sprockets 14, (Fig. 14) about which the two chain conveyors (Fig. 2) are adapted to engage. The work carriages or vises F, are secured to these conveyor chains in a manner later to be described and are adapted to hold the work while the same passes under the different cutting units. An intermittent movement is imparted to the conveyor chains so that the work carriages will be guided forward for a short distance, and then will be stopped for a short time, sufficient to allow the longitudinally traveling cutting units to perform their respective operations upon a piece of work.

Referring to Figs. 4 and 5, we will describe the cut-off units A, and the method of adjusting the same with respect to the work. Carried by the frame 1 of the machine and integral therewith, are two dovetail guide rails 16, (see Fig. 1 and Fig. 2). Slidable on each guide rail is a slide 17 (Figs. 4 and 5) which is adapted to support the transverse guide rails 41 which support the cutting unit B. Referring to Figs. 1 and 4, it will be noticed that the slide 17 is provided with a forward extension 17ª. A vertical guide 18 is carried by the extension 17ª (Fig. 5) for supporting the cut-off mechanism A. The carriage 19, which supports the cut-off saw and motor for driving the same, slides in the guideway 18 and is provided with an elongated slot 20 through which the stud 21 is passed, said stud being screwed into the body of the extension 17ª. This will hold the carriage 19 in the guide and limits its movement. Rotatably supported by said carriage is a hand wheel 22, and a threaded shaft 23 secured thereto, which is adapted to be screwed into the boss 24 carried by the extension 17ª. By rotating the hand wheel, the carriage 19 may be adjusted vertically so as to raise or lower the saw to obtain a correct adjustment of the same with respect to the work. Carried by the carriage 19 is a hollow cylindrical sleeve 25, and a casing 26 is slidable therein. A stud 27 screwed into the casing and passing through a slot 28 carried by the sleeve 25, limits the travel of said casing with respect to the sleeve. A motor 29 is bolted to the casing 26 and mounted within the hollow casing 26 in suitable ball bearings 30, is a driving shaft 31, which has secured on the end thereof a rotary saw 32. An adjusting screw 33 rotatably supported by the said casing is threaded at one end, said threaded portion adapted to be screwed into the boss 34 carried by the sleeve 25. By loosening bolt 27 and applying a wrench to this adjusting screw, the casing 26 may be adjusted transversely of the machine so as to cut off the ends of the door pillars to attain any desired length.

An ear 35 is carried by the carriage 19, and a swiveling screw 36 carried by the sleeve 25 is adapted to be screwed into a bushing 37 pivotally carried by the ear 35. The hand wheel 38 is secured to this bushing and adapted to turn the said bushing when the hand wheel is turned, thereby causing the screw 36 to move. The sleeve 25 is pivoted to the carriage 19 at 39, and the free end of the sleeve supports the swiveling screw 36. Obviously, as the screw 36 is screwed into the bushing, it will cause the free end of the sleeve to rotate about its pivot, thereby adjusting the cut-off saw so as to enable the same to accurately square the ends of the door pillar.

The shaping unit B is supported immediately behind the units A upon the track 41 (see Figs. 1 and 2). This unit is adapted to shape the side of the door pillar to a shape as shown in Fig. 25. The cutting unit E, which is the unit that performs the rabbeting operating, is actuated similarly as the unit B. It is only necessary however, to provide one control, later to be described, for both of the cutting units, said control adapted to govern the feed of both cutting units transversely of the machine.

Referring to Figs. 2 and 3, it will be noticed that the slides 17 are supported on the guide rails 16 carried by the frame of the machine. Bolted to the two slides 17 as at 40 is a transverse guide rail 41. Secured to this guide rail 41 is a pattern 42 which controls the vertical position of the cutters 43, the operation of which will now be described.

A traveling major carriage 44 is slidably secured on the guide 41 and is provided with a pair of vertical guide ways 45 (see also Fig. 6) on which the vertically sliding carriage 46 is supported. This minor carriage 46 supports the cutters 43 driven by motor M, and it is evident that the cutters are allowed to be raised away from the work when the cutter carriage is raised due to the cam action now to be described.

The carriage 46 rotatably supports a roller 47, which is adapted to roll on the pattern 42. As shown in Fig. 6, the roller is riding upon the pattern, the cutter unit being fed transversely of the machine in the direction indicated by the arrow. As the cutting unit reaches the position to the extreme right, as indicated in Fig. 2, the roller will ride on the inclined cam surface of the pattern 42, thus raising the cutter off the work.

A stud 48 (Fig. 6) is carried by the casting 44, and is adapted to engage the dogs 49 and 49', carried by the bar 50. The bar 50 is supported at both sides of the machine by levers 51, (Fig. 2) which are pivoted to the cross guide rail 41, as at 52. An additional link 53 connects the sliding bar 54 with an intermediate point on the lever 51. Thus, as the major cutter carriage moves across the machine, the stud 48 will strike either of the dogs 49 or 49', and thus cause the sliding bar 54 to move. The purpose of this will be more clearly understood when the operation and construction of the cross feed is described.

Suspended by the guide member 41 is a motor 55 (Fig. 3). The gear 56 is secured to the motor shaft 57, and meshes with the gear 58, which is secured to a shaft 59, rotatably supported by this guide rail 41. The central portion of the shaft 59 is screw-threaded as at 60, and a nut 44$^a$ (Fig. 6) is secured to the major carriage 44 through which this screw threaded portion of the shaft 59 is adapted to be screwed. Thus as the motor is driven, the shaft 59 will be rotated causing the major carriage 44 to travel transversely of the machine. But the said carriage is guided on the cross guide 41, carrying with it the cutters and rollers 47, which are thereby caused to ride on the pattern so as to lower the cutters onto the work.

The slide bar 54 has lugs 61 and 62 secured thereto (Fig. 3). A shaft 63 is continuously driven through a worm and worm gear mechanism 64 (see Fig. 24) and a sprocket 65 and sprocket chain 66, which is driven off the sprocket wheel 67 (see Fig. 13), the sprocket wheel 67 being secured to the shaft 68, to which the worm gear 6 is secured. The shaft 68, is continuously rotated and thus, referring back to Fig. 3, will cause the shaft 63 to be continuously rotated and carry with it the arm 69 which is keyed thereto and which carries a roller 70 adapted to engage the lugs 61 and 62, carried by the slide bar 54.

In Fig. 3, the direction of travel of the shaping unit is as indicated by the arrow. The motor 55 is driven in a direction that will cause the screw threads 60 on the shaft 59 to move the major cutter carriage to the right. Rigidly supported on the machine is a slide valve 71 with piston 72, said piston being connected by means of the link 73 to the slide bar 54 (see Fig. 3). As the major carriage is fed across the machine, the arm 69 is rotated counter-clockwise and is so timed that the roller 70 will strike the lug 62 when the cutting unit reaches the end of its travel. But an instant before the roller 70 strikes the lug 62, the stud 48 carried by the major carriage 44 will strike the dog 49', thus causing the bar 50 to move to the right (Fig. 2). Through the link connections 51 and 53 with the slide bar, the slide bar 54 is also caused to move to the right, thus moving the piston 72 and the rod 74. The rod 74 is connected to the rack 75 (see Fig. 30) and as the rack is moved it will rotate the gear 76, with which it meshes. Referring now to Fig. 31, the gear is secured to a shaft 77, which extends down into the switch box 78. Secured to this shaft 77 is an arm 79, which is adapted to be swung to the right or left. The contact points 80 and 80' connect with a pair of magnets. As the arm 79 contacts with either of these contacts it will energize either of the magnets, thus causing the knife switch to be thrown in either of the two positions. This is a standard switch control and is known as the "Monitor" controller. With a slight movement of the bar 50, the rod 74 is actuated; the arm 79 in the switch box is caused to move and to break the electrical connection to the magnet, thereby allowing the spring switch arm $s$ to return to a neutral position, thus cutting off the power to the motor 55. As the roller 70 strikes the lug 62, it will move the pistons and arm 74, also the contact arm 79 to the extreme position, causing the contact between the arm 79 and contact 80 and thereby energizing the other magnet to throw the switch and to reverse the motor, causing the cutting unit to travel back across the machine or to the left.

The motor 55 and screw-threaded shaft 59 will not stop instantly, and due to the momentum of the moving parts it is necessary to provide a suitable braking action. A split collar 60$^a$ (Fig. 3) is secured on the threaded portion 60 of the shaft (see Fig. 32) and is clamped thereon. A coil spring 60$^b$ is interposed between the nut 44$^a$ and the collar 60$^a$ (Fig. 6). As the moving parts override the spring is compressed thus cushioning the cutting unit and bringing the same to a gradual stop.

In order to hold the cutters off the work as the cutting units B and E travel backwardly, we have provided each with an air cylinder 8², (Fig. 3) supported on the major carriage 44, and a piston 83, secured to a connecting rod 84, which is secured to the vertical minor carriage 46. It is possible to adjust the piston with respect to the cutting unit by means of the nut 81, rotatably supported on the piston rod, which screws into the cross member 85 of the cutter supporting frame.

When the cutting unit reaches its furthest position to the right, the roller 47 is caused to ride up on the cam pattern or form, thereby raising the cutter from the work and forcing the piston upwardly in the air cylinder 82. At this point the piston 72, mounted in the air cylinder 71, is moved to the dotted line position (see Fig. 3) thereby allowing the compressed air to flow from the air line 86 into the line 87, thence into the air cylinder 82, below the piston. This air is under about 80 pounds pressure and is sufficient to hold the minor carriage 46 in the raised position while the same is fed backwardly across the machine.

When the cutting unit reaches a position to the left the first thing that happens will be the stud 48 engaging the dog 49, thereby actuating the bar 50 in a manner similar to the action when the stud strikes the dog 49'. First the motor will be cut off and then the roller 70 carried by the arm 69 will strike the lug 61 and push the piston 72 to the left or to the full line position as shown in Fig. 3. This will open the flexible air line 87 to the exhaust line 88, thereby allowing the air in the air cylinder 82 to exhaust to the atmosphere and allow the minor carriage 46 to fall preparatory to another cutting operation. At the same time, when the piston 72 is moved to the left, the rod 74 is also moved and actuates the switch through the rack and gear mechanism as described, to throw in the motor and to again feed the cutting unit across the machine to the right.

The machine is so timed that during the rabbeting and shaping operations, or while the cutter is traveling transversely of the machine, the conveyor chains 15, which carry the work carriages are at rest, but while the cutting unit is moved backwardly across the machine, the chains through the "Geneva" driving mechanism are caused to move forward to bring another piece of work into line with the cutting unit. The machine is so timed that the chains 15 will move at a rate of speed so as to bring in another piece of work into line with the two cutting units, and bring the same to rest before the motor 55 is reversed to again feed the cutters 43 across the work.

The rabbeting unit E is built identically the same as the shaping unit B, with the exception that it does not have the bar 50, the air piston control, or the switch control. The one control can operate both motors. The compressed air will be forced into the air cylinder 82ᴱ at the same time that air is forced into the air cylinder 82. The construction of these cylinders and the way in which they support the cutter carriage is identical and need not be described again.

Following the shaping operation comes the grooving operation, which is the cutting of one or more grooves c in the end of the door pillar, as shown in Fig. 26. Referring to Fig. 7 and Fig. 1, it will be noticed that a transverse supporting rail 90 is secured to saddles 91, which are adjustably secured to the guide rail 16, carried by the frame of the machine. Adjustable on this transverse rail 90 is a groover support 92, which rotatably supports a sleeve 93, which carries a motor 94, a shaft 95, driven thereby and supported in suitable bearings 93ᵃ, said shaft carrying one or more saw blades 96. A lug 97 (Fig. 8) is secured to the support 92, and a screw-threaded shaft 98 is screwed into this lug and is rotatably supported by the rail 90; the other end of the said screw-threaded shaft being squared as at 99, so that when the bolts 300 are released, a tool may be applied to rotate the shaft, thereby providing an adjustment by which the grooving saws may be moved transversely of the machine so as to cut the proper depth of groove in the end of the door pillar.

The groover support 92 is provided with an ear 100, into which is screwed a screw-threaded stud 101, which is rotatably supported by an extension of the sleeve 93. As this screw is rotated, it will cause the sleeve 93 to be raised or lowered, according to what adjustment is necessary. In this way, an adjustment vertically may be had. This grooving unit remains stationary and the work is caused to pass by, thereby cutting the grooves in the ends of the pillar, while the chain 15 is running. The motor 94 is operated independently and is continuously running, during the operation of the machine.

The gaining unit D is continuously operated by an electric motor G (Fig. 10) and will cut the groove d in the door pillar (see Fig. 27 and Figs. 9 and 10). Secured to the saddles 301, which are adjustable on the guide rails 16, is a transverse guide channel rail 110, and slidable on this guide rail is a gainer support 111, which may be adjusted to any point along the guide 110 by means of a screw-threaded shaft 112 having a square portion 113, where a tool may be applied for rotating the same. This screw-threaded shaft is supported in suitable bearings 114, carried by the channel 110. A nut 115 is part of the gainer support 111, and the threaded portion of the shaft 112 is screwed into this nut and as the screw is turned, the support may be moved along the guide rail 110 to position the gainer at any desired point. The support 111 is provided with the vertical guide rails 116, and plates 117 are secured to the face of these guide rails for forming a guide in which the cutter carriage is slidably engaged. The support 111 is formed with the overhanging ear 118 integral therewith, for rotatably supporting a screw-threaded stud 119, to which is secured a hand wheel 120, for actuating the same. The threaded portion of the stud 119 is adapted to be screwed into a bushing 121, carried by an ear 122, said ear formed integral with the cutter support. The cutter carriage is provided with a slot 122, and a stud 123, is screwed into the casting 111 and projected through this slot, thereby limiting the vertical movement of the cutter support and serving to lock the carriage in adjusted position. By turning the hand wheel, the stud 119 will cause the cutter support to be raised or lowered thereby providing a vertical adjustment for the cutter.

The motor that is carried by the rabbeting unit E is continuously driven. Referring to Fig. 21, we have shown a detail of this motor, and the automatic work-positioning device which is adapted to locate the work so that the rabbet may be accurately cut into the door pillar. The cutter 130 is keyed or otherwise secured to the shaft 131 driven by the electric motor 132. This shaft is supported by suitable bearings 133, and a flanged collar 134 is secured on the shaft and held against endwise displacement, but a ball bearing 135 is inserted so that the shaft may rotate freely within said flanged collar. A bushing 136 is secured on the end of the shaft and a nut 137 and lock nut 138 are secured on this bushing and shaft respectively. Another flanged collar 139 is slipped over this bushing, and a coil spring 140 is interposed between the nut 137 and this flanged collar, thereby placing the collar under spring pressure to force the same inwardly or to the left, as viewed in Fig. 21. The shaft, collar and bearings are all slidably supported within the motor housing.

Now, as the rabbeting unit is lowered onto the work, as has already been described the flanged collars will straddle the work, and correctly locate the cutters with respect to the work, as the shaft which supports the rabbeting cutter can slide in and out of the housing. However, it would be possible to cause the motor housing to move by providing suitable bearings between the housing and its support. Then the whole rabbeting unit will move together. This adjustment is necessary due to the fact that it is impossible to stop the chain at a point closer than ⅛ of an inch to the correct theoretical stopping point. However, these flanged collars will correctly position the cutters with respect to the work and a rabbet may be cut in the door pillar as shown in Figs. 28 and 29, thus completing the cutting of the door pillar.

The work carriage or vise F which is adapted to clamp the work and carry the same along the machine will now be described. The chains 15 are driven by the driving sprocket wheels 14 and pass around the idling sprocket wheels 150 (Figs. 1 and 14). The plate 151 (Figs. 17–18) is provided with a downwardly extending lug 152, which is adapted to be clamped to the chain 15. The upper surface of this plate is provided with a series of transverse V-shaped grooves 153, and the clamping mechanism is adapted to be secured on top of this plate as will now be described. An L-shaped bracket 154 is bolted at one end of the base plate by means of screws 155.

The other part of the clamp consists of a special casting 156, which is secured to the base plate by means of the bolt 157. The casting 156 is provided with the bosses 158, which are bored out as at 159 (see also Figs. 19 and 20) and a plunger 160, is adapted to be slidably fitted in each bored out hole. The plunger 160 is drilled out as at 161, and the member 162 is fitted into the drilled hole 161. The outer end of the member 162 is slotted as at 163, and a plate 164 is pivotally secured to the member 162 as at 165. The inward end of the member 162 is provided with a reduced extension 166, having an elongated slot 167. A pin 168 is carried by the plunger and is adapted to engage in this elongated slot to allow a slight movement of the member 162 with respect to the plunger. A coil spring 169 is interposed between the shoulder 170 formed by the reduced end extension and bottom of the drilled hole 161, thereby forcing the clamping plate outwardly. Pivotally secured to the sides of the casting 156 as at 171 are downwardly extending arms 172. These arms carry the bolt 173 which extends across the carriage and connects the two arms. Slots 176 are cored out in the side walls of the casting to allow for the movement of the bolt 173. Links 174 are carried by this bolt and are adapted to be pivotally secured to each plunger 160 as at 175.

Carried by the frame of the machine is a guide rail 180 (Fig. 18) on which the carriage is adapted to be slidably guided (see also Fig. 2). The guide rail 180 is provided with two tracks 181 secured thereto or formed integral therewith. The arms 172 are provided with rollers 182 on the inside, which are adapted to engage the tracks 181. Referring to Fig. 1, it will be noticed that the end of this guide rail 180 at the front of the machine is beveled as at 183. As the work carriage or vise carried by the chain comes to these guide rails 180, and is guided onto the V-shaped guides 184, carried by said guide rails, the rollers carried by the arms 172 will strike the beveled faces 183, and cause the arms to rotate counter-clockwise, as the roller must ride down on this beveled face. In Fig. 17, we have shown the position of the clamp in the locking position,—that is, the rollers engaged under the tracks 181, thereby forcing the plunger and clamping plate to the right, clamping the work represented by the dot-and-dash line in Fig. 17, between the jaws 154 and 164 of the vise. This clamp cannot be released as long as the rollers 182 are riding under the tracks 181. At the rear of the machine, (see Fig. 14) however, the tracks 181 are cut off thereby allowing a free movement of the arms 172 in a clockwise direction. As the carriage and chain travel over the driving sprocket (see Figs. 1, 14, 15 and 22) the arms 172 are engaged by a knock-out, now to be described, for automatically releasing the clamp.

As the vise leaves the track 181 the clamp is not released though it is free to be released by the knock-out. The arm 172 is pivoted at 171 and the pivot point 173 between the arm and links 174 is past the dead center between the pivots 171 and 175. Obviously some power is necessary to throw the point 173 past dead center to release the clamp.

Refer to Fig. 14. The gear 192 is keyed or otherwise secured to a sleeve 193, (Fig. 15) which is in turn keyed to the shaft 12 and obviously the gear 192 will rotate at the same speed as the sprocket 14. A gear casing 194 is supported by the machine and the sleeve 193 is rotatably supported within the casing in suitable ball bearings 195. The casing supports a train of gears 196 and 197. The gear 196 meshing with the gear 192, and are of such a size that the gear 197 will rotate four times as fast as the gear 192; that is, the ratio between the gear 192 and 197 is 4 to 1. The gear 197 is keyed or otherwise secured to a shaft 198 (see Fig. 22). The said shaft extending through the casing and has a dog 200 secured to a reduced end portion 199. The rotation of this dog 200 is so timed with respect to the travel of the work carriage (see Fig. 14) that the dog which travels in a counter-clockwise direction is adapted to strike the arms 172, and cause the said arms to be moved in a clockwise direction, thereby causing the bolt 173 carried by said arms to move downwardly past dead center and to the left carrying with it the links 174 and the vise jaw 164, thereby releasing the work and allowing the same to drop out of the work carriage.

Refer to Fig. 11. Sometimes it is desirable to advance or retard the chain 15 so as to correctly locate the work carriage with respect to the respective cutting units. To do this, it is necessary to advance or retard the driving shaft 12. This adjustment is obtained in the following manner: a stud 210 is secured to the rotating or driven member 11 (Fig. 12) of the "Geneva" mechanism. A collar 211 is keyed to the shaft 12 and as the adjusting screws 212 (Fig. 11) are screwed in or out, the collar 211 may be moved with respect to the driven member of the "Geneva" mechanism. This will either advance or retard the driving shaft 12 with respect to the driving mechanism.

Similarly the armed collar 213 (Fig. 14) is secured to the shaft 12 adjacent the sprockets 14. Adjusting screws 214 and studs 215 which are screwed into the sprocket (Fig. 15) are actuated by the adjusting screws 214, so as to advance or retard the sprocket wheel with respect to the driving shaft 12 in a way similar to the adjustment obtained in the "Geneva" mechanism, as described.

The guide rails 180 are secured to the track supporting carriages 220 (see Fig. 2). These carriages are slidably secured to the cross channel 221, which is secured to the frame (see also Fig. 16). The cross channel 221 supports a long screw-threaded shaft 222. Bosses 223 are carried by the carriages 220 and support the internally threaded worm gear hub 224, which is adapted to be engaged by the threaded portion of the screw-threaded shaft 222. The said carriages 220 have a plate 225 secured on the bottom thereof and this plate 225 is provided with suitable bearings for supporting a shaft 226 (see Fig. 16) and a worm 227. This adjusting shaft extends to the front of the machine (see Fig. 1). A worm gear 228 meshes with the worm 227 and the stationary screw-threaded shaft 222 is screwed into this worm gear 228, which is supported on the plate 225 in suitable bearings 229. As the shaft 226 is rotated, the worm gear is caused to rotate and travel along the screw-threaded shaft 222, thereby moving the carriages 220 transversely of the machine. In this manner an adjustment of the guide rails 180 may be had so as to support long or short door pillars. In addition, the driven and driving sprockets may be locked to their respective shafts in a position so that the chains will be the same desired distance apart, so that the carriages guided thereby may be correctly located with respect to the guide rails.

In order to better comprehend the apparatus as a whole, and understand how the various units cooperate in the progressive automatic operations, it seems advisable to explain the operation of the machine by explaining one cycle of operation.

The operator takes preferably two pieces of work here shown as two door stiles. He places these in the jaws of the two vises opposite each other on the conveyor chain 15. As each set of vises rises up at the idle sprocket end of the machine, the operator charges the vise with two pillars. We have already explained how the "Geneva" drive serves to drive the conveyor intermittently. This drive is so timed and each of the rabbeting and shaping units is so adjusted that when the work is under the cutters of these two units the work is stopped. This is illustrated in Fig. 1. Now, taking a pair of pillars, we shall follow this through the machine. This set of pillars is first fed to the two saws of the cut-off unit A. These operate upon the work as the work is traveling. This serves to cut the pillars off the desired length.

The pillars proceed right through the saw and then come to the position shown under the shaping cutters 43, in Fig. 1. The "Geneva" mechanism here stops the work as the work arrives directly under the cutters of the shaping unit. This shaping unit which travels back and forth across the machine, has just reversed. It now starts across the machine longitudinally of the pillars. The two cutters cutting out the stock as shown in Fig. 2 to shape the inside of the pillar. When the end of the pillar is reached, the pin 48 strikes the stop 49'. This throws the bar 50 to the right. Bar 50 is connected through the link 53 with the slide 54, which connects with the piston valve rod 74. This piston valve rod 74 (Fig. 3) operates the switch arm 79, and this controls the reversing switch, which is shown in Fig. 31. This however, simply cuts out the motor and shuts off the power. This stops the travel of the major carriage 44, but of course, the momentum may carry it on a slight distance. This, however, is unimportant as the carriage will ride up the high part of the pattern 42. At this point (refer to Fig. 3) the arm 69 which is continuously rotating at a properly timed speed, comes in contact with the lug 62. This shifts the control lever 54 still further to the right, and shifts the piston rod also to the right. This piston rod controls the slide valve and now air is admitted through the pipe 87 to the cylinders 82. This lifts the cutters, if they have not already been lifted, completely off the work and holds them in this elevated position. At the same time, the rod 74 has shifted the switch arm 79 (Fig. 31) into contact with the contact 80. This then completes the reversal of the travel of the shaping unit, the motor 55 being energized now to turn in a reverse direction, causes the shaping unit carriage to travel back across the machine. When the pin 48 engages the stop 49 on the rod 50, the switch arm 79 is again disengaged from its contact and the motor is stopped preparatory to reversing. This control is a dual one—first, throwing the current off in the motor to permit the motor to stop and the momentum to be arrested without harm to the parts; when the carriage has come to rest, then the cam apparatus again starts the motor in the reverse direction. This prevents all harm to the apparatus. This cam apparatus at the same time controls the air flow into the lifting cylinders for the purpose of either letting the air in to lift the cutters or else letting the air out to allow the cutters to drop on the work. The weight of the cutter carriage is sufficient to cause the cutters to follow the pattern and the cutters to properly engage with the work.

When the shaping carriage has started back from the left on its idling return trip, the "Geneva" drive again starts the conveyor chain. The vise, together with the work, then travels along the bed of the machine being supported in relatively rigid relation with respect to the frame, by reason of sliding on the tracks 184, as clearly shown in Fig. 18. The arms of the vise are held under the tracks 181, so as to keep the vise jaws tightly on the work. By reason of riding on the tracks and by reason of the arms riding under the tracks 181, the vise is held tightly to the machine while traveling.

Refer to Fig. 1. The work now travels into engagement with the groove saws 96, traveling continuously onward as these grooving saws cut channels through the ends of the pillar. The work then continues on and comes in contact with the cutter 302 of the gainer. This serves to cut or gain the required cross slot in the pillar.

The work then continues on until it comes under the rabbeting knife 130. It is important that this rabbeting knife strike the pillar just at the right place, otherwise the rabbet would not be cut in the proper place on the pillar. The conveyor chain is not entirely free from looseness and consequently no matter how careful the adjustments, the lie of the pillar may not be absolutely correct under the rabbeting knife when the "Geneva" drive stops the chain. However, when the air is released from the air cylinders 82$^E$, and the cutter carriage with the cutter drops down on the work, the flanges 134 and 139 (Fig. 21) will drop down over the work, moving the cutter the fraction of an inch that may be necessary to properly line it up with the work. This rabbeting cutter then travels across the machine and longitudinally of the pillar in the same way that the shaping cutter does. It is rabbeting one piece of work at the same time the shaping cutter is shaping another piece. As already explained, the one control 50 controls both the motors that run the shaping unit and the rabbeting unit across the machine. The rabbeting carriage returns across the machine on its idling trip in the same way the shaping unit does and under the same control.

The work then proceeds on until the end of the track 180 is reached. The clamping lever of the vise is now free to open, but as explained, the lever is thrown past dead center, thereby holding the work in the vise. However, we have provided an automatic knock-out to release the clamp. This comprises the parts already described and which are best shown in Fig. 14. Through a train of gears which is properly timed, the arm 200 overtakes the vise arm 172 as the vise travels down the sprocket wheel 14. This serves to force the jaws apart, and hence when the vise drops down under the sprocket wheel, the work will simply drop out of the jaws.

The work in traveling from the shaping unit to the rabbeting unit will stop twice before arriving under the rabbeting unit, as shown in Fig. 1.

At the side of the machine (Fig. 1) we have shown a large number of electric switches 303. These are cut-off switches for the numerous motors that are used on the machine. This enables the operator to instantly start or cut out any motor.

In claiming the invention, we have had occasion in numerous places in the claims to refer to the door pillars or pillar. Probably strictly speaking, the most accurate term to designate the specific work that happens to be here illustrated in the drawings is "door stile." However, these vertical, uprights for doors are ordinarily known in the trade as "pillars." The door posts against which the door shuts are very often called pillars. It would be obvious however, that the machine has a broad application to any kind of a longitudinal member having a workable substance on which longitudinal and cross operations are to be performed. Door posts, cross bars, and a great many other forms of longitudinal members could be subjected to similar operations by a machine of this kind. We therefore wish it understood that when the term "door pillars" or "pillar" is used in the claims, these are not words of limitation but simply words of description that are more convenient to use for making clear the thought.

What we claim is:

1. In a machine for the purpose specified, the combination of means for moving door pillars through the machine, means for shaping the pillars traveling longitudinally thereof, means for cutting off the pillars to length, means for cross gaining the pillars, means for grooving the end of the pillars, means for longitudinally rabbeting the pillars, and means for releasing the pillars from the conveyor.

2. In a machine for the purpose specified, the combination of means for moving door pillars through the machine, means for shaping the pillars, traveling longitudinally thereof, means for cutting off the pillars to length, means for gaining the pillars, crosswise means for grooving the end of the pillars, and means for rabbeting the pillars.

3. In a machine for the purpose specified, the combination of means for moving the pillar through the machine, means for cutting the pillar to shape by a longitudinal operation, means for cutting the pillar to length, means for grooving the end of the pillar and means for gaining the pillar, all cooperating together to work automatically on the pillar as it passes through the machine.

4. In a machine for the purpose specified, the combination of means for moving door pillars through the machine, means for cutting the pillars to length, means for shaping the pillar by a longitudinal cutting operation and means for grooving the end of the pillar, all said means cooperating together to work automatically on the pillar as it passes through the machine.

5. In a machine for the purpose specified, the combination of means for moving door pillars through the machine, means traveling longitudinally of the pillars for shaping the pillars, means for grooving the end of the pillar, means for gaining the pillar and means for rabbeting the pillar, longitudinally thereof, all said means cooperating to operate on the pillar as it passes through the machine.

6. In a machine for the purpose specified, the combination of means for moving door pillars through the machine, means traveling longitudinally of the pillar for shaping the pillars, means for grooving the end of the pillar, means for gaining the pillar and means for rabbeting the pillar longitudinally thereof, all said means cooperating to operate on the pillar as it passes through the machine, and means for releasing the pillars out of the conveying means.

7. In a machine for the purpose specified, the combination of means for moving door pillars through the machine, means for working longitudinally of the pillar for cutting and shaping the door pillars, means for grooving the ends of the pillars, and means for cross gaining the pillars, all of said means automatically operating on the pillars as they pass through the machine.

8. In a machine for the purpose specified, the combination of means for moving door pillars through the machine, means operating longitudinally for shaping the pillars and means for cross grooving the ends of the pillars, the said means operating together automatically as the pillars pass through the machine.

9. In a machine for the purpose specified, the combination of means for moving door pillars through the machine, means for grooving the ends of the door pillar, means for cutting off the door pillars to length, means for gaining the door pillars, means traveling longitudinally of the pillar for rabbeting the door pillars and means for releasing the pillars out of the conveyor, all of said means operating automatically on the pillars as they pass through the machine.

10. In a machine for the purpose specified, the combination of means for moving door pillars through the machine, means for grooving the ends of the pillars, means for gaining the pillars, and means for cutting off the ends of the pillars, and means operating longitudinally on the pillar for rabbeting the pillars, all operating automatically on the pillars as they pass through the machine.

11. In a machine for the purpose specified, the combination of means for conveying pillars through the machine, means for grooving the ends of the pillars, means for gaining the pillars, and means for longitudinally rabbeting the pillars, all operating automatically on the pillars as they pass through the machine.

12. In a machine for the purpose specified, the combination of means for moving pillars through the machine, means for grooving the ends of the pillars and means operating longitudinally on the pillar for rabbeting the pillars, said means operating automatically on the pillars as they pass through the machine.

13. In a machine for the purpose specified, the combination of means for moving door pillars through the machine, means for cross gaining the door pillars, means for cutting off the door pillars to length, means traveling longitudinally of the pillar for shaping the door pillars, means for longitudinally rabbeting the door pillars, and means for releasing the door pillars, all operating automatically on the pillars as they pass through the machine.

14. In a machine for the purpose specified, the combination of means for moving door pillars through the machine, means for cross gaining the door pillars, means operating longitudinally on the pillar for shaping the door pillars, and means for longitudinally rabbeting the door pillars, said means all operating automatically on the pillars as they pass through the machine.

15. In a machine for the purpose specified, the combination of means for moving door pillars through the machine, means for cross gaining the door pillars and means operating longitudinally on the pillar for shaping the door pillars, said means operating automatically on the pillars as they move through the machine.

16. In a machine for the purpose specified, the combination of means for moving door pillars through the machine, means for cross gaining the door pillars while in motion and means for longitudinally rabbeting the door pillars, said means operating automatically on the pillars as they pass through the machine.

17. In a machine for the purpose specified, the combination of means for moving door pillars through the machine, means for longitudinally rabbeting the door pillars, means for cutting off the door pillars to length, means traveling longitudinally of the pillar for shaping the door pillars and means for grooving the ends of the door pillars, all operating automatically on the pillars as they pass through the machine.

18. In a machine for the purpose specified, the combination of means for moving pillars through the machine, means for rabbeting the pillars, means traveling longitudinally of the pillar for cutting the pillars to shape and means for grooving the pillars, all operating automatically on the pillars as they pass through the machine.

19. In a machine for the purpose specified, the combination of means for moving the pillars, crosswise through the machine, means for longitudinally rabbeting the pillars, and means for longitudinally shaping the pillars, said means operating automatically on the pillars as they move through the machine.

20. In a machine for the purpose specified, the combination of means for moving door pillars through the machine, means for longitudinally rabbeting the door pillars, means for cutting off the door pillars to length, means traveling longitudinally of the pillar for shaping the door pillars, means for grooving the ends of the door pillars, and means for releasing the door pillars from the conveyor, all operating automatically on the pillars as they pass through the machine.

21. In a machine for the purpose specified, the combination of means for intermittently moving door pillars through the machine, means for grooving the ends of the pillars as they pass through the machine and means for performing a longitudinal cutting operation on the pillars as they remain stationary.

22. In a machine for the purpose specified, the combination of means for intermittently moving pillars through a machine, means for performing a cut-off action on the pillars as they move through the machine, means for performing a grooving operation on the ends of the pillars as they move through the machine, and means for performing a longitudinal cutting action on the pillars as the same are stopped.

23. In a machine for the purpose specified, the combination of means for intermittently moving pillars through a machine, means for performing a longitudinal action on the pillar when the same is stopped, and means for performing a transverse action on the pillar when the same moves, the second mentioned means including a unit controlled by an air cylinder which serves to lift and hold the unit inactive on its return trip along the pillar as the pillars move for the transverse cutting action.

24. In a machine for the purpose specified, means for intermittently moving pillars through a machine with their axes at right angles to the line of travel, a carriage for traveling cross-wise of the machine and longitudinally of the pillar, and means for first shutting off the power that drives the carriage and then subsequently, after an appreciable interval, reversing the power to cause the carriage to travel back.

25. In a machine for the purpose specified, means for moving pillars through a machine, a cross traveling carriage for performing a longitudinal operation on the pillar, electrically powered means for causing the travel of the carriage, air controlled means for lifting the operating portion of the carriage, and means for automatically controlling both the reversal of the carriage by reversing the power, and the lifting of the carriage by controlling the air pressure at the ends of travel.

26. In a machine for the purpose specified, means for moving pillars through the machine, a cross traveling carriage for performing a longitudinal action on the pillar, electrically powered means for driving the carriage, and means operated by the travel of the carriage for first switching off the current and then after an appreciable interval, reversing the motor.

27. In a machine for the purpose specified, means for moving pillars through the machine, a cross traveling carriage provided with a vertically traveling cutter carriage and an air cylinder automatically controlled for controlling the lift of the carriage for the working stroke of the cross traveling carriage and the return idling stroke of the carriage.

28. In a machine for the purpose specified, means for moving pillars through a machine, a carriage traveling transversely of the machine, means for driving said carriage, means for controlling the vertical lift of a portion of the carriage, and means for automatically controlling both the vertical lift and the reversal of the carriage, comprising an electric switch and an air control valve conjointly operated by the moving carriage.

29. In a machine for the purpose specified, means for moving pillars through a machine, a carriage traveling transversely of the machine, means for driving said carriage means for controlling the vertical lift of a portion of the carriage, and means for automatically controlling both the vertical lift and the reversal of the carriage, comprising an electric reversing switch first disengaged then appreciably later reversed conjointly with the operation of an air control valve which controls the lift.

30. In a machine for the purpose specified, means for moving pillars through a machine, a carriage traveling transversely of the machine, means for driving said carriage, means for controlling the vertical lift of a portion of the carriage, and means for automatically controlling both the vertical lift and the reversal of the carriage, comprising a slide valve which forms an air control to operate the lift and an electric reversing switch connected with the slide valve the said slide valve operated by the movement of the carriage.

31. In a machine for the purpose specified, means for moving pillars through a machine, including an automatic traveling vise provided with a pair of clamping jaws, means for performing cutting operations on the pillar and means for releasing the jaws comprising a properly timed moving arm which after the vise has traveled through the machine establishing a connection with the jaws to release the same.

32. In a machine for the purpose specified, means for moving door pillars intermittently through a machine and a cross traveling rabbeting unit provided with means for accurately lining up the rabbeting cutter with the pillar.

33. In a machine for the purpose specified, means for intermittently moving door pillars through a machine at right angles with the line of travel and a cross traveling rabbeting unit provided with a pair of relatively yieldable collars which can be dropped down over the pillar to line the rabbeting cutter up with the pillar.

In testimony whereof we affix our signatures.

GEORGE W. GOULD.
MONTE B. GATHMAN.